United States Patent
Morioka

(10) Patent No.: US 9,629,183 B2
(45) Date of Patent: Apr. 18, 2017

(54) MOBILE COMMUNICATIONS SYSTEM, INFRASTRUCTURE EQUIPMENT, MOBILE COMMUNICATIONS TERMINAL AND METHOD TO COMMUNICATE USER DATA WITHIN AN UPLINK RANDOM ACCESS CHANNEL

(75) Inventor: Yuichi Morioka, Reading (GB)

(73) Assignee: SCA IPLA HOLDINGS INC., New York, NY (US)

( * ) Notice: Subject to any disclaimer, the term of this patent is extended or adjusted under 35 U.S.C. 154(b) by 55 days.

(21) Appl. No.: 14/237,487

(22) PCT Filed: Aug. 10, 2012

(86) PCT No.: PCT/GB2012/051945
§ 371 (c)(1),
(2), (4) Date: Feb. 6, 2014

(87) PCT Pub. No.: WO2013/027018
PCT Pub. Date: Feb. 28, 2013

(65) Prior Publication Data
US 2014/0185575 A1    Jul. 3, 2014

(30) Foreign Application Priority Data

Aug. 19, 2011 (GB) .................................. 1114339.3
Aug. 19, 2011 (GB) .................................. 1114340.1

(51) Int. Cl.
*H04W 4/00*   (2009.01)
*H04W 74/08*  (2009.01)
*H04W 72/12*  (2009.01)

(52) U.S. Cl.
CPC ... *H04W 74/0833* (2013.01); *H04W 72/1268* (2013.01)

(58) Field of Classification Search
None
See application file for complete search history.

(56) References Cited

U.S. PATENT DOCUMENTS 6,014,562 A     1/2000  Weiss
6,535,547 B1 *  3/2003  Lyckegård et al. ........... 375/145
(Continued)

FOREIGN PATENT DOCUMENTS

CN    1491522 A     4/2004
EP    2 365 717 A1  9/2011
(Continued)

OTHER PUBLICATIONS

International Search Report issued Jan. 25, 2013 in PCT/GB2012/051945.
(Continued)

*Primary Examiner* — Otis L Thompson, Jr.
(74) *Attorney, Agent, or Firm* — Oblon, McClelland, Maier & Neustadt, L.L.P.

(57) ABSTRACT

A mobile communications terminal for communicating data to/from one or more base stations of a mobile communications network, the one or more base stations being arranged to provide a radio interface to communicate with mobile communications terminals. The mobile communications terminal being arranged to communicate with the one or more base stations via the radio interface, the communicating including using an uplink random access channel of the radio interface to transmit random access messages to the one or more base stations and communicating user data via the uplink random access channel by transmitting one or more of the random access messages at a selected timing within the uplink random access channel, the timing being selected by the first mobile communications terminal to represent at least part of the user data.

24 Claims, 8 Drawing Sheets

(56) References Cited

U.S. PATENT DOCUMENTS

| | | |
|---|---|---|
| 2001/0026547 A1 | 10/2001 | Moulsley et al. |
| 2004/0264497 A1* | 12/2004 | Wang et al. .............. 370/465 |
| 2006/0068821 A1* | 3/2006 | Rinne ...................... 455/515 |
| 2007/0230600 A1 | 10/2007 | Bertrand et al. |
| 2008/0194259 A1* | 8/2008 | Vujcic et al. ............ 455/435.1 |
| 2009/0161650 A1* | 6/2009 | Imamura et al. .......... 370/342 |
| 2009/0238141 A1* | 9/2009 | Damnjanovic et al. ...... 370/331 |
| 2011/0105121 A1* | 5/2011 | Kazmi et al. .............. 455/436 |
| 2011/0222527 A1* | 9/2011 | Hole et al. ................ 370/348 |
| 2011/0235558 A1* | 9/2011 | Diachina ............ H04W 48/02 370/310 |
| 2011/0299492 A1* | 12/2011 | Lee ..................... H04W 4/00 370/329 |
| 2011/0310854 A1* | 12/2011 | Zou ................ H04W 74/0891 370/336 |
| 2012/0033613 A1* | 2/2012 | Lin .................. H04W 74/085 370/328 |
| 2013/0136072 A1* | 5/2013 | Bachmann ............ H04W 4/00 370/329 |
| 2014/0133430 A1* | 5/2014 | Yang ..................... H04L 1/1854 370/329 |

FOREIGN PATENT DOCUMENTS

| | | |
|---|---|---|
| EP | 2 434 828 A1 | 3/2012 |
| JP | 2002-78007 | 3/2002 |
| WO | WO 99/60812 A1 | 11/1999 |
| WO | WO 01/74107 A1 | 10/2001 |

OTHER PUBLICATIONS

United Kingdom Search Report issued Dec. 8, 2011 in Patent Application No. GB1114340.1.
U.S. Appl. No. 14/239,688, filed Feb. 19, 2014, Morioka.
Japanese Office Action issued Feb. 16, 2016 in corresponding Japanese Application No. 2014-526543 (6 pages).
Chinese Office Action issued Dec. 19, 2016 in Chinese Application No. 201280040124.1 (2 pages).

* cited by examiner

MOBILE COMMUNICATIONS SYSTEM, INFRASTRUCTURE EQUIPMENT, MOBILE COMMUNICATIONS TERMINAL AND METHOD TO COMMUNICATE USER DATA WITHIN AN UPLINK RANDOM ACCESS CHANNEL

CROSS-REFERENCE TO RELATED APPLICATIONS

The present application is based on PCT filing PCT/GB2012/051945 filed 10 Aug. 2012 and claims priority to British Patent Application 1114340.1, filed in the UK IPO on Aug. 19, 2011 and British Patent Application 1114339.3, filed in the UK IPO on Aug. 19, 2011, the entire contents of each of which is incorporated herein by reference.

FIELD OF THE INVENTION

The present invention relates to mobile communications systems for communicating data to/from communications terminals and methods for communicating.

BACKGROUND OF THE INVENTION

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, which is a total of the geographic locations where access to the networks is possible, is expected to increase rapidly.

The anticipated widespread deployment of third and fourth generation networks has led to the parallel development of a class of more simple terminals and applications which, do not require high data rates which are available via the LTE radio interface but instead take advantage of the robust radio interface and increasing ubiquity of the coverage area. Examples include so-called machine type communication (MTC) applications, which are typified by semi-autonomous or autonomous wireless communication terminals (i.e. MTC terminals) communicating small amounts of data on a relatively infrequent basis. Thus the use of an MTC terminal may differ from the conventional "always-on" use case for conventional LTE terminals. Examples of MTC terminals include so-called smart meters which, for example, are located in a customer's house and periodically transmit information back to a central MTC server data relating to the customer's consumption of a utility such as gas, water, electricity and so on. In the example of a smart meter, the meter may both receive small data transmissions (e.g. new price tariffs) and send small data transmissions (e.g. new reading) where these data transmissions are generally infrequent and delay-tolerant transmissions. Characteristics of MTC terminals may include for example one or more of: low mobility; time controlled; time tolerant; packet switched (PS) only; small data transmissions; mobile originated only; infrequent mobile terminated; MTC monitoring; priority alarm; secure connection; location specific trigger; network provided destination for uplink data; infrequent transmission; and group based MTC features (for example: group based policing and group based addressing). Other examples of MTC terminals may include vending machines, "sat nav" terminals, and security cameras or sensors, etc.

Mobile networks developed recently are generally well adapted to high-rate and high reliability services and may not always be well suited to MTC services.

SUMMARY OF THE INVENTION

According to an aspect of the invention, there is provided a mobile communications terminal, the mobile communications terminal being configured to communicate via a radio interface provided by one or more base stations of a mobile communications network. The mobile communications terminals is arranged to communicate with the one or more base stations via the radio interface by using an uplink random access channel of the radio interface to transmit random access messages to the one or more base stations. The mobile communications terminals is configured to communicate user data via the uplink random access channel by transmitting one or more of the random access messages at a selected timing within the uplink random access channel, the timing being selected by the first mobile communications terminal to represent at least part of the user data. There can therefore be provided a mobile communications terminal that may transmit user data in a random access channel by selecting a timing of transmission of a random access message in the random access channel, thereby allowing the terminal to communicate data in an uplink random access channel in addition to the random access message, which according to a predefined standard is conventionally for communicating other predetermined information, such as for example a request for uplink resources.

A technical problem addressed by embodiments of the present invention is to improve an efficiency of communicating data using mobile communications networks for transmitting small messages for example such as those used for MTC communications. This is because mobile communications network, such as LTE for example, have been designed to include a random access channel for transmitting random access messages for requesting uplink resources for communicating substantial quantities of user data. Typically the random access messages have a format which is predefined to request the uplink resources. As will be understood this is one example. However for some applications only a small amount of data is required to be sent, such as for example where the mobile terminal forms part of an MTC communications device. Accordingly embodiments of the present invention are arranged to communicate data by selecting a timing of transmission of a random access message within the random access channel. The random access message itself may have a predefined format which is communicating data for a different purpose, for example to identify the mobile terminal and/or the mobile terminal's request for uplink resources.

In one example, user data may be represented by changing a relative temporal position of the random access message within the random access channel. In another example, the random access message may be communicated in the random access channel of some sub-frames of a radio access interface but not others. For example, the sub-frames may be paired and the random access message may be transmitted in a first or a second of the pairs of sub-frames to represent a binary "1" or a "0". Furthermore in other examples blocks of random access time and frequency resources which form part of the random access channel may be selected from an available set of blocks of random access time and frequency resources to communicate at least part of the user data. The following sections provide different example techniques which form aspects and features of the present technique.

In some examples the communications terminal receives timing advance information regularly, which is used to adjust the timing of transmission of the random access message in the random access channel, before the timing of transmission can be selected to represent the user data. This example may correspond to communications terminals which are mobile. However in other examples, particularly those which correspond to more simple communications terminals such as MTC devices, timing advance information may be communicated to the communications device less often, such as for example once on power on or device reset. Once the timing advance information is received from the base station, the communications device assumes that its timing advance is correct until a reset condition or power-off. As such a more simplified arrangement is provided to MTC devices, which are known to be deployed in a substantially static applications, such as for example a parking meter.

Various further aspects and features of the present invention are defined in the appended claims and include an infrastructure equipment such as a base station, a communications terminal, a mobile communications network and a method of communicating.

BRIEF DESCRIPTION OF THE DRAWINGS

Example embodiments of the present invention will now be described with reference to the accompanying drawings in which like parts have the same designated references and in which.

DESCRIPTION OF EXAMPLE EMBODIMENTS

The present application benefits from a claim to the Paris convention priority of UK patent application GB1114339.3 filed 19 Aug. 2011 and UK patent application GB1114340.1 filed 19 Aug. 2011 the contents of which are incorporated herein by reference.

Example embodiments of the present technique will be generally described in the context of a 3GPP LTE architecture. However, the invention is not limited to an implementation in a 3 GPP LTE architecture. Conversely, any suitable mobile architecture is considered to be relevant. For example, when the description refers to an "eNB" or "e-NodeB", the eNB is used as an example for the purposes of illustration and it will be apparent to the skilled person how the present techniques can be used with any other type of base stations (e.g. a BTS in GSM).

Conventional Network

Figure 1:
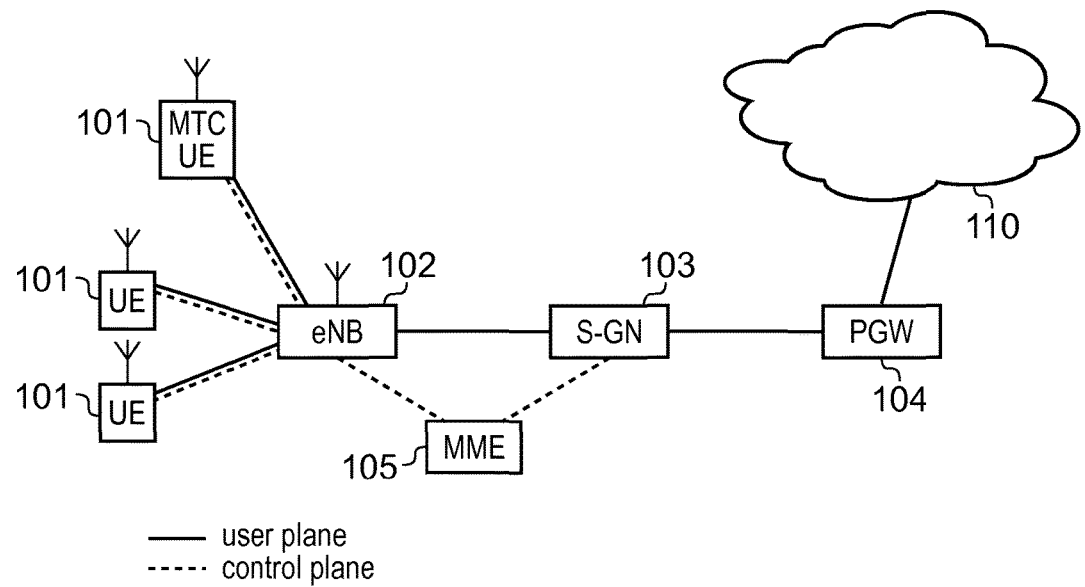
FIG. 1 is a schematic block diagram of a mobile communications network according to the LTE standard.

FIG. 1 provides a schematic diagram illustrating the basic functionality of a conventional LTE mobile telecommunications network. The network includes one or more base stations 102 (one base station represented) connected to a serving gateway (S-GW) 103 for traffic in the user plane and to a Mobility Management Entity (MME) for signalling in the control plane. In LTE, the base stations are called e-NodeB, which are referred to in the following description as eNB. Each base station provides a coverage area 103 within which data can be communicated to and from mobile terminals (or UEs) 101. Data is transmitted from a base station 102 to a mobile terminal 101 within a coverage area via a radio downlink (DL). Data is transmitted from a mobile terminal 101 to a base station 102 via a radio uplink (UL). The core network, comprising the MME 105, the S-GW 103 and the PDN-Gateway (P-GW) 104, routes data to and from the mobile terminals 101 and provides functions such as authentication, mobility management, charging and so on. The P-GW is connected to one or more other networks, which may for example include the internet, an IMS core network, etc. In the illustration of FIG. 1, connections on the user plane have been represented with a plain line while connections on the control plane have been represented with a dashed line.

Figure 2:
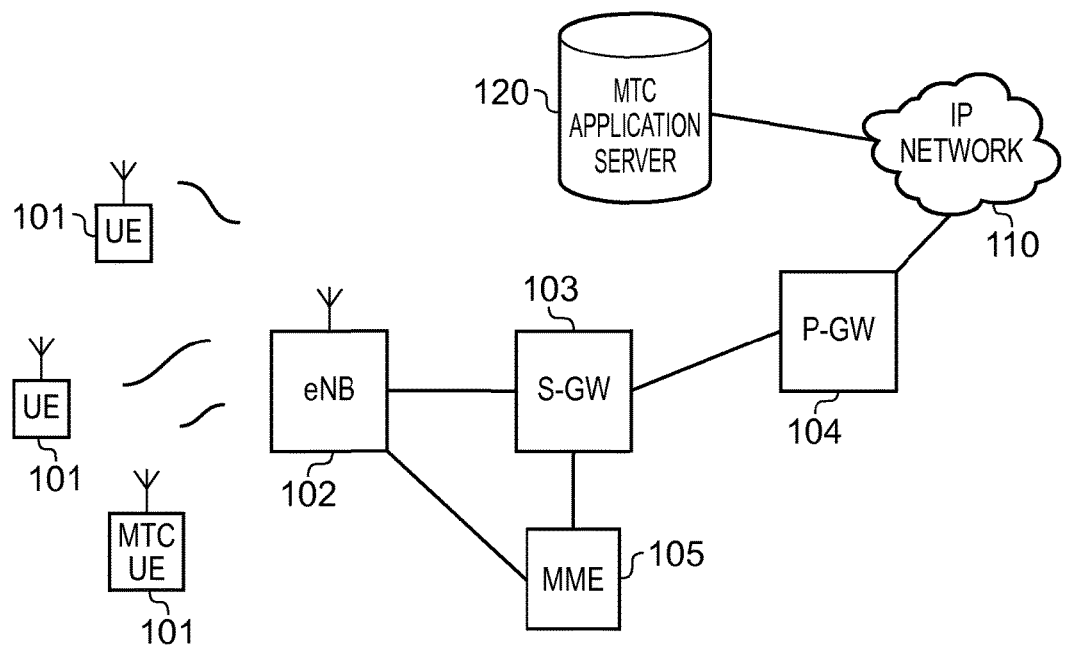
FIG. 2 illustrates an example of a mobile network suitable for MTC devices and services.

In the illustration of FIG. 2, the mobile network also provides an access to an MTC application server 120 via an IP network (e.g. the Internet). In another example, the MTC application server 120 may be located within the mobile network. One or more of the mobile terminals 101 may form an MTC device, for example a vending machine or a smart meter and may receive and/or send data to the MTC application server 120.

Figure 3:
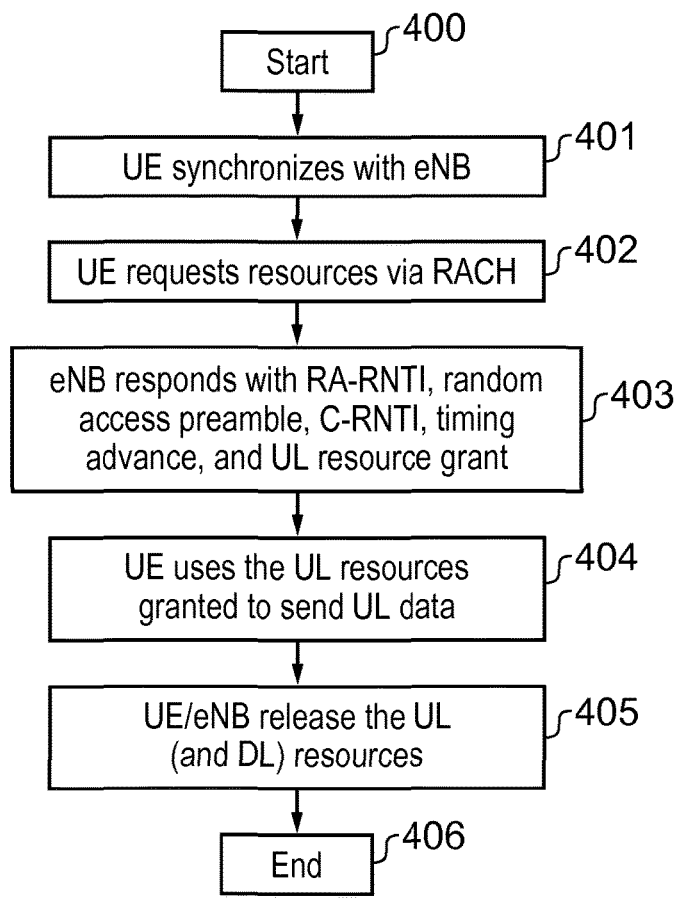
FIG. 3 is an illustration of a method for a terminal to connect to an e-NodeB and send data on the uplink.
Figure 4:
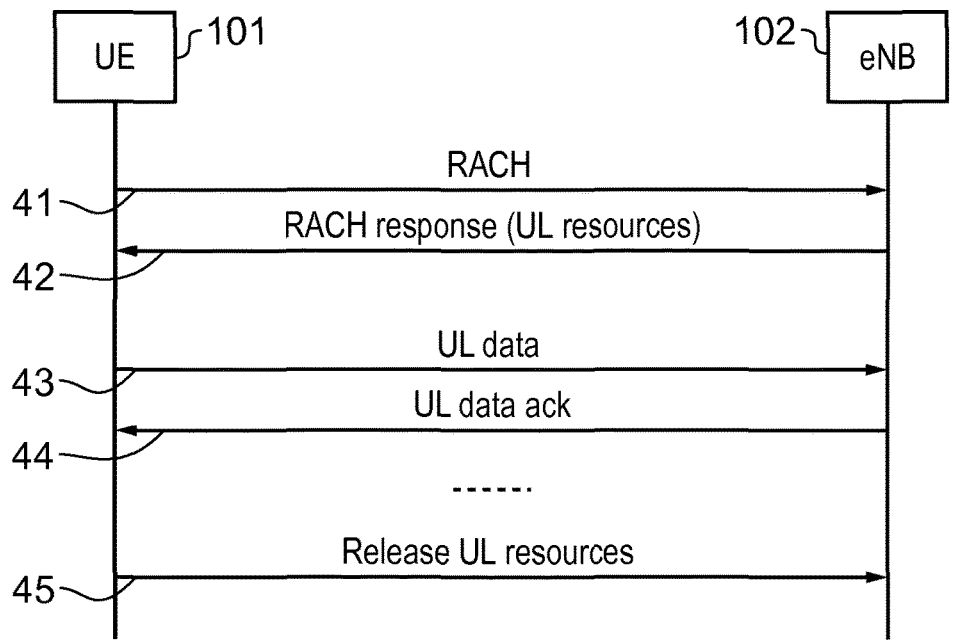
FIG. 4 is an illustration of a conventional message exchange for a terminal requesting uplink resources in a LTE network and using the uplink resources.
Figure 5:
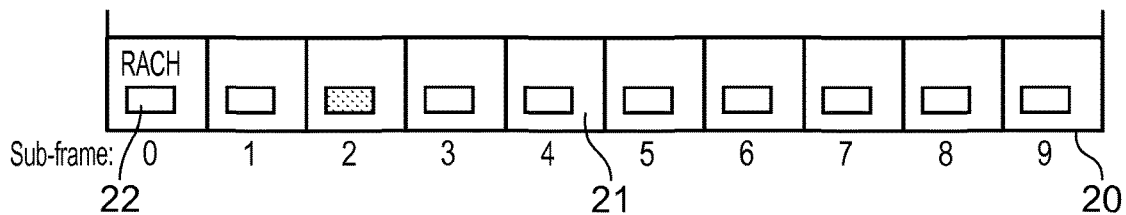
FIG. 5 is an illustration of a conventional uplink frame suitable for use in the method of FIG. 4.

The following description provides a summary explanation of an example of a conventional operation in which a mobile terminal connects to the mobile network and wishes to send data (i.e. on the uplink) to the one or more eNBs 102, with reference to FIGS. 3-5, which is helpful in appreciating some aspects and advantages of the present technique.

FIG. 3 is an illustration of a method for a terminal to connect to an eNB and send data on the uplink. At the start at a step 400 of the method, the communications terminal which may or may not be mobile (also called UE) may for example be switched on, may come into the coverage area of an eNB, or be already connected to the network and be handing over to a new eNB. In any case, at a step 402 the terminal then synchronises with the eNB, using for example the PSS, SSS and PBCH signals sent by the eNB on a regular basis. Once the terminal is synchronised with the eNB, the terminal has to requests uplink resources so that it can send uplink data to the eNB. At a step 402, the terminal sends a resource request to the eNB in an RACH message. The RACH stands for "random access channel" and is used in LTE for terminals that do not have uplink resources allocated to them and that wish to have an allocation for such resources. In LTE, the terminal sends a message in the RACH channel, at a specific time and frequency, the message comprising a preamble (a number chosen from amongst 64 possibilities). At a step 403, as the eNB receives the RACH message from the terminal, the eNB responds to the terminal with a message sent via the PDCCH and PDSCH and comprising several parameters, which may include:

RA-RNTI: the RA-RNTI is based on a combination of the random access preamble and the time and frequency at which the RACH message was sent. This is so as to differentiate two terminals that could have sent two RACH messages with the same preamble. It is used as an identifier for the terminal so that it can detect that the response it receives is a response to its RACH message sent earlier and not a response to another terminal. The CRC of the response is scrambled by the RA-RNTI.

Random access preamble: so that the terminal can check that the preamble to which this response message relates is the preamble that the terminal used in its RACH message.

Temporary C-RNTI: temporary identity for the terminal to be used at least in future downlink communications.

Timing advance: the eNB estimates the delay for the terminal's transmission from its estimated position within the cell served by the eNB to arrive at the eNB and gives the terminal an indication of how much it should shift its message so that its UL transmission are aligned with all other UL transmissions, as they arrive at the eNB.

UL resources grant: the eNB notifies the terminal of the UL resources that have been allocated for the terminal to send its UL data.

Then, at step 404, the terminal uses the allocated UL resources for sending its UL data. Once the data has been sent, and assuming that the terminal and eNB do not have any more data to send, they can release any allocated UL (and possibly DL) resources at step 405 before the method ends (step 406).

FIG. 4 illustrates a simplified possible call flow corresponding to the method of FIG. 3. FIG. 4 shows in particular messages corresponding to steps 402-405. The terminal 101 first sends a RACH message to the eNB 102 to request resources and receives a response 42 including the UL resources allocation. The terminal then uses the UL resources to send data on the uplink (message 43). In the example of FIG. 4, the UL data message 43 is followed by an acknowledgement ("ack") message 44 which confirms that message 43 has been successfully received. Many more messages 43 (and optional ack messages 44) may then follow depending on the amount of data to be sent by the terminal 101. Once the UL resources are no longer required, the terminal 101 or the eNB 102 may trigger the release of these UL resources with message 45.

FIG. 5 is an illustration of a conventional uplink frame 20 suitable for use in the method of FIG. 3 and/or in the call flow of FIG. 4. In LTE, a frame 20 is generally divided into 10 sub-frames 21, numbered from 0 to 9 in FIG. 5. In the example of FIG. 5, the RACH 22 has resources available for terminals to send a RACH message in every sub-frame of the frame. In other configurations, some but not all of the sub-frames may have resources available for the RACH channel or some frames may not have any resources allocated to the RACH. For example, the RACH may be provided only in the first sub-frame of even-numbered frames. The conventional RACH methods and the present techniques are presented in the context of a frame having RACH resources in each and every sub-frame. However, the invention is not limited to this configuration and the same principles can be applied to a configuration where one or more frames include a sub-frame without any RACH resources and, optionally, where some frames do not include any RACH resources.

In the example of FIG. 5, the RACH resources in the second sub-frame have been shaded to illustrate that the terminal 101 has sent a RACH message in the RACH provided in this second sub-frame.

The conventional RACH procedure, as illustrated in FIG. 3-5, is the first step for a terminal to request uplink resources. Generally, further signalling is then required for the terminal to set up the relevant uplink and downlink connections, for example a RRC connection between the terminal 101 and the eNB 102. Therefore, the amount of signalling involved can be high when compared with the size of a small message. In the event that the terminal 101 has to send large amount of data, this conventional method can be efficient as the data/signalling ratio then becomes high. If however the terminal only has a small amount of data to send, this method may be inefficient as the data/signalling ratio then becomes low. Thus the smaller the amount of data the less the efficiency becomes because the amount of signalling is substantially constant. In the case of MTC type applications, the terminal is likely to have only small amount of data to send and the data is generally not delay-sensitive data. Furthermore, MTC type applications are likely to require reduced functionality in comparison to conventional mobile terminals, in order to reduce the cost of producing such devices. This is because it is envisaged that MTC devices will be more ubiquitous and utilitarian than conventional mobile terminals and therefore should be less expensive to produce in order to be attractive to use mobile communications networks to transmit and receive data. Accordingly, it can be desirable to have a simplified terminal for MTC-type services and applications.

It may therefore be desirable to provide ways to improve an efficiency of the network for transmitting small messages (or even very small messages) and/or MTC communications. The following sections provide different example techniques which form aspects and features of the present technique.

Transmission and Encoding of Data Via a Random Access Channel

As will be appreciated from the above explanation, a technical problem is presented to provide ways to improve an efficiency of mobile communications networks for transmitting small messages (or even very small messages) and/or MTC communications. The following sections provide different example techniques which form aspects and features of the present technique.

Figure 6:
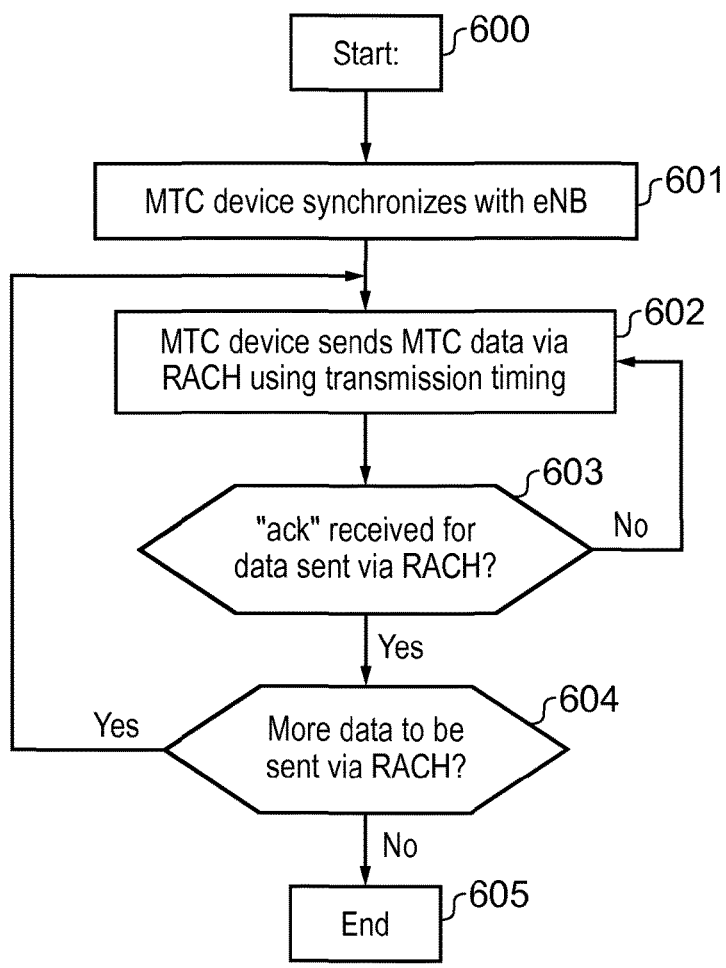
FIG. 6 is an example of a method for sending data using an uplink random access channel.

According to the present technique, a terminal uses RACH messages to send data to the eNB using at least timing selection. The timing selection can be used to encode data, for example data of a short message. An example of a method for sending data via a random access channel is illustrated in FIG. 6. In this example, the terminal 101 is an MTC device and re-uses available RACH messages to send its data. As the method starts (600), the terminal 101 synchronises with an eNB at a step 601, for example in a conventional manner. The terminal 101 then sends a RACH message where the terminal uses transmission timing to encode at least part of the data at a step 602. Details as to how the encoding can be performed are provided further below. In this example, the terminal 101 expects an "ack" message in response to the RACH message sent at the step 602. Such an ack message may for example be carried in a RACH response message or in any other type of suitable message. The terminal determines at a step 603 whether it has received such an acknowledgement in response to the RACH message. If it has not received any acknowledgement, for example before the expiry of a timer triggered by the transmission of the RACH message, the terminal then goes back to the step 602 to re-send the relevant RACH message. If however the terminal receives an ack message for the RACH message, it can then move to a step 604. Even though the example of FIG. 6 includes checking whether an acknowledgement message has been received, this step 603 is optional. In another example, the terminal may not expect any ack message, and may then jump from the step 602 to the step 604. At the step 604, the terminal 101 determines whether it has more data to be send via the RACH. If the terminal has already sent all of the data it had to send, the method may then end (step 605). If however the terminal 101 still has data to sent in this manner, the method them goes back to the step 602 in order for the terminal 101 to send the outstanding data in one or more RACH messages.

Figure 7:
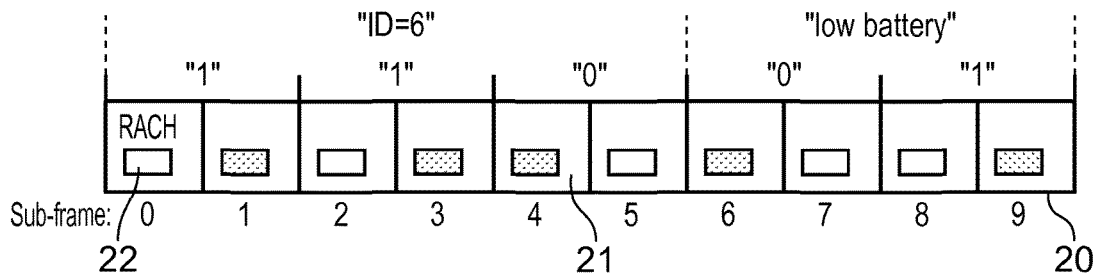
FIG. 7 is an example of an uplink frame suitable for use in the method of FIG. 6.

Using transmission timing to encode data enables the terminal 101 to send data using what may appears to be a conventional RACH message, thereby providing good backward compatibility capabilities. An example of encoding using transmission timing is illustrated in FIG. 7. FIG. 7 shows a frame 20 including ten sub-frames numbered from 0 to 9, where each sub-frame includes resources allocated for the (e.g. conventional) RACH. In this example, the terminal can encode data by selecting a sub-frame(s) in which it sends a RACH message. For example, using a binary encoding, sending a RACH message in an even-numbered sub-frame encodes "0" while sending a RACH message in an odd-numbered sub-frame encodes "1". Thus, in the example of FIG. 7, five bits can be encoded in one frame and by sending a RACH message in sub-frames 1, 3, 4, 6 and 9, the terminal can encode "11001". In this example, the first three bits encode an ID ("110"=6) while the last two bits encode a status ("01"=low battery). For example a smart meter can indicate to a central server that its internal element number six (e.g. the electricity meter rather than the gas meter or any other element) has a low battery.

In an example where the RACH is only provided in some but not all sub-frames (not shown), the terminal can encode the data using transmission timing in relation to the selection of the block(s) of RACH channel resources. The block of RACH resources is a time and frequency slot provided on the uplink for the terminals to send their RACH messages. In effect, all of the blocks of RACH resources form the RACH. For example in a situation where the RACH is provided once every three sub-frames, the terminal could use the positioning of a RACH message within a pair of subsequent blocks of RACH resources in two different sub-frames to encode a "0" or a "1". In another example, the selection may be performed on a block of RACH resources selection basis, rather than on a sub-frame selection basis. For example, there may be cases where two blocks of RACH resources are provided in a sub-frame. In that case, the terminal may select one of the first and second resource blocks within the sub-frame so as to encode a "0" or a "1". In this case, a bit can be encoded for every sub-frame comprising two blocks of RACH resources.

In another example (not shown), there may be only one block of RACH resources per frame, for example one block of RACH resources in the second sub-frame of each frame. The sub-frame selection may then be performed across a range larger than a frame. For example, it may be performed across a group of ten frames, where a sub-frame selection based on a binary encoding would enable a possible encoding of five bits in the group of ten frames.

Figure 8:
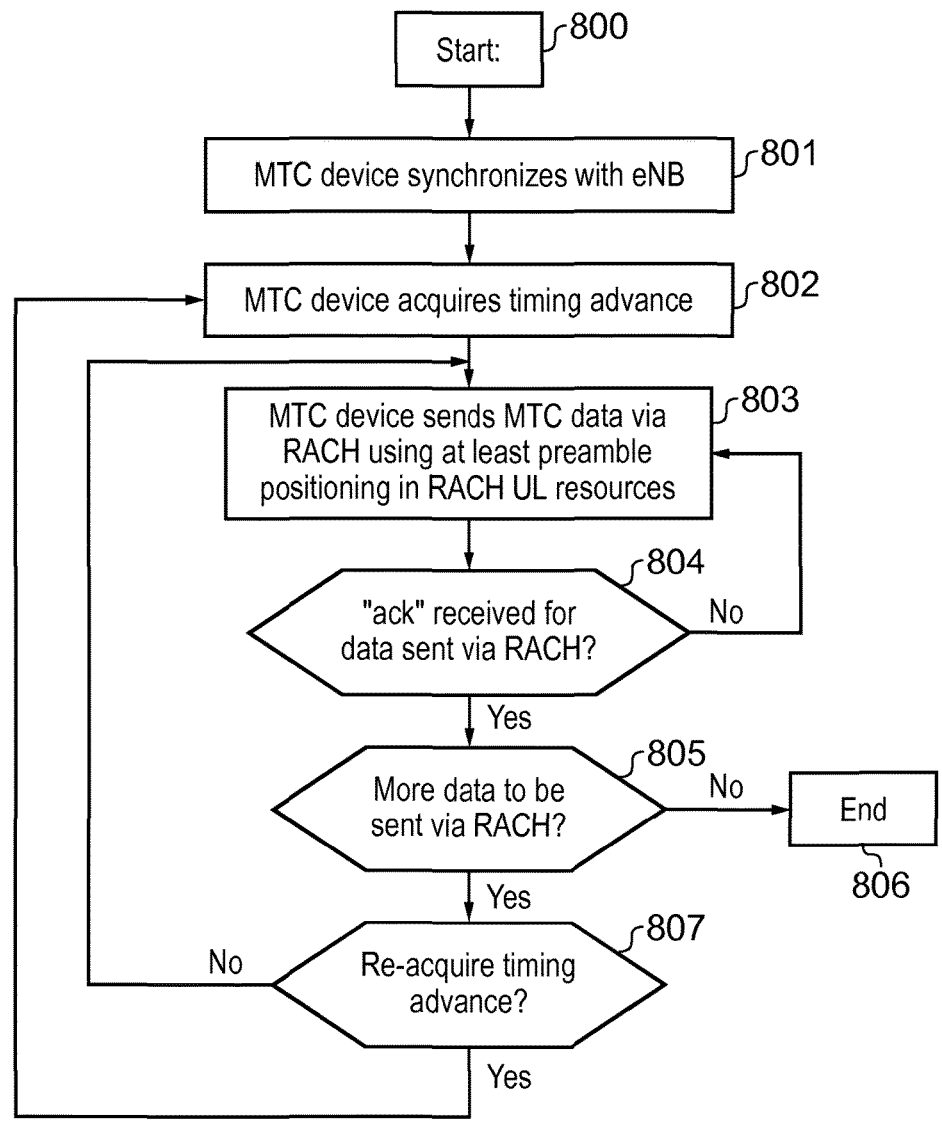
FIG. 8 is an example of a method for sending data using an uplink random access channel and preamble positioning.

In the method illustrated in FIG. 8, the terminal 101 can send data via the RACH using preamble positioning in the uplink block of random access channel resources. In other examples, such as where the uplink random access channel is used to send a message other than a preamble, the same principle can be applied by positioning this message within the block random access resources, in order to encode data. In the example of FIG. 8, the method starts at a step 800 and the terminal 101 synchronises with the eNB at a step 801. The terminal 101 then acquires the timing advance, for example from the eNB and using RACH messages, so that it can be fully aligned with the uplink timing. Then, at a step 803 the terminal 101 sends data via the RACH using preamble positioning in the block of RACH resources. This example also includes an optional step 804 of checking whether an acknowledgement message has been received for the data sent at the step 803. If not, the terminal returns to the step 803 to re-send the data. Else the method moves on a step 805 where it is determined whether the terminal 101 still has data to send via the RACH. If not, the method may end at a step 806. If however the terminal 101 still has data to send, the method then goes to a step 807 where it is determined whether the terminal 101 need to re-acquire timing advance. For example, the terminal may have a location element which can determine whether the terminal 101 has moved relative to the eNB 102 and therefore requires a new timing advance. Alternatively, the terminal 101 may be a stationary element, for example a smart meter or a parking meter, and in that case the step 807 may be omitted altogether as the terminal knows that it is stationary. If it is determined that the current timing advance is satisfactory enough, the method can then return to the step 803 and send further data using preamble positioning in the RACH resources. If however it is determined that a new timing advance should be acquired, the method then goes to the step 802 where the terminal 101 acquires a new timing advance.

Figure 9:
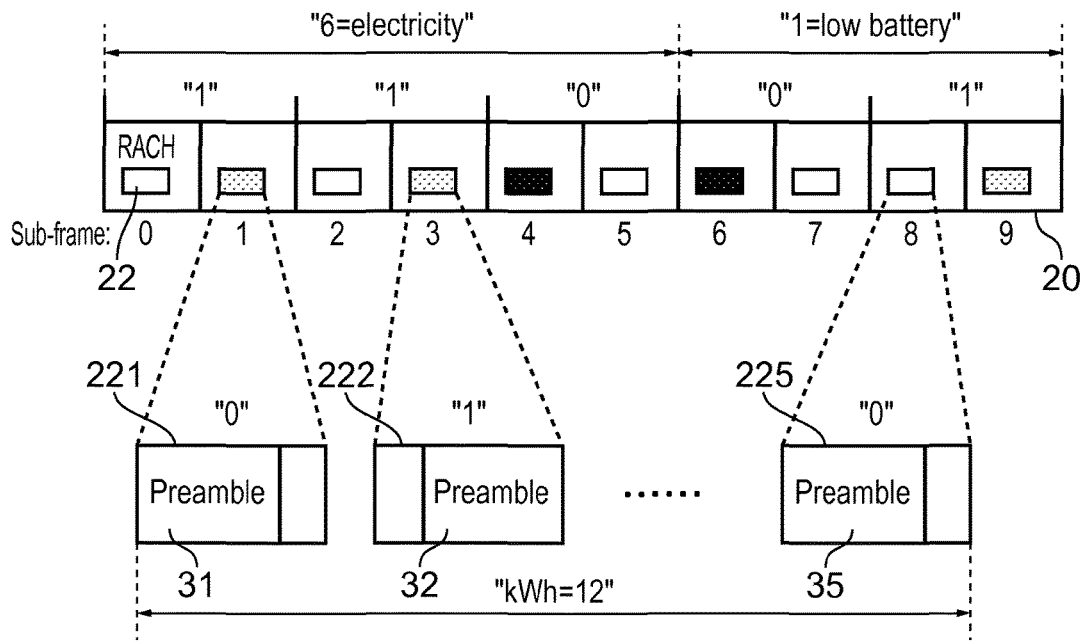
FIG. 9 is an example of an uplink frame suitable for use in the method of FIG. 8.

FIG. 9 illustrates an example of a frame suitable for encoding data using a combination of two transmission timing techniques: preamble positioning in RACH resources and RACH messages positioning amongst sub-frames. As in FIG. 7, the positioning of the RACH messages encodes "110" and "01". In addition, in each of the sub-frames, the positioning of the content of the RACH message (i.e. the preambles 31-35) within the blocks of RACH resources 221-225 also encodes data. In this example, a preamble positioned at the beginning of the block of resources encodes a "0" while a preamble positioned at the end of the block of resources encodes a "1". Because in FIG. 9 the frame includes five RACH message, five more bits can be encoded using this technique. In this particular example the preamble positioning has been used to encode "01100" (some bits are not shown in the Figure). If this device is a smart meter, it can for example indicate that it is sending an electricity reading of 12 kWh while indicating that the device has a low battery.

Figure 10:
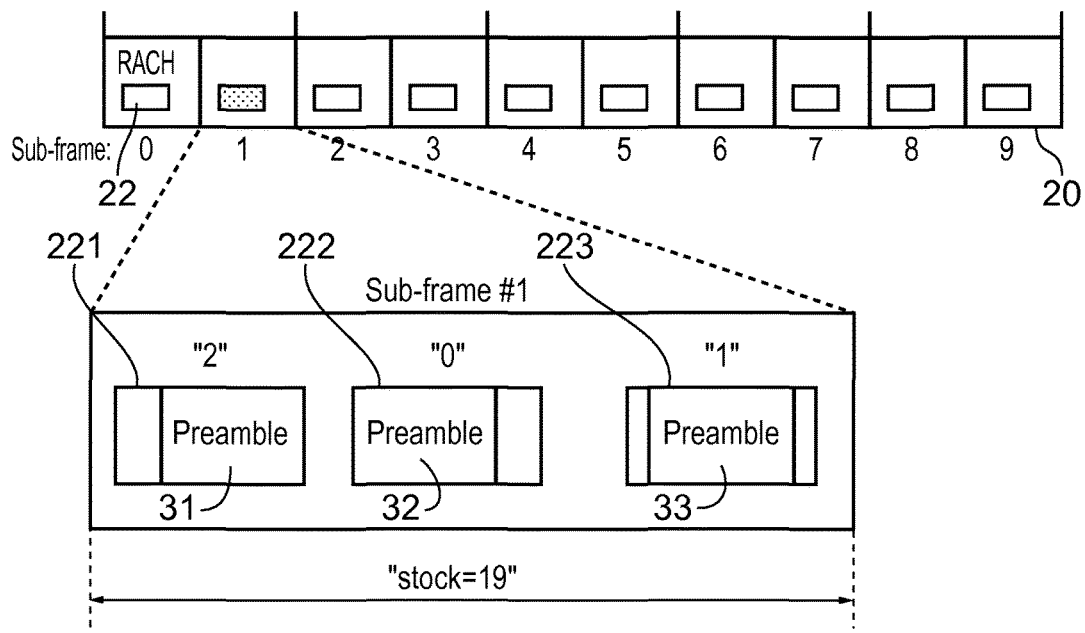
FIG. 10 is an example of an uplink frame suitable for use in the method of FIG. 8.

In the example of FIG. 10, the terminal uses only preamble positioning within the block (221-223) of RACH resources for encoding data and, in this case, the number are not encoded as binary numbers but as base-3 numbers. If the preamble is at the preamble of the block of random access resources, the number encoded is "0", if it is in a middle position it is "1" and if it is at the end of the block of resources, it is "2". Also, in the example of FIG. 10, several uplink blocks of random access resources are provided within a single sub-frame. This particular combination thus encodes "201" which encodes the number 19 in base-3. For example the device may be a vending machine indicating that its stock level is currently 19.

Any other type of suitable encoding using transmission positioning may be used when encode numbers and may for example rely on a base-n encoding where n is equal to or greater than two, although it will be appreciated that binary encoding may be more convenient due its wide use for encoding, decoding and storing data.

Figure 11:
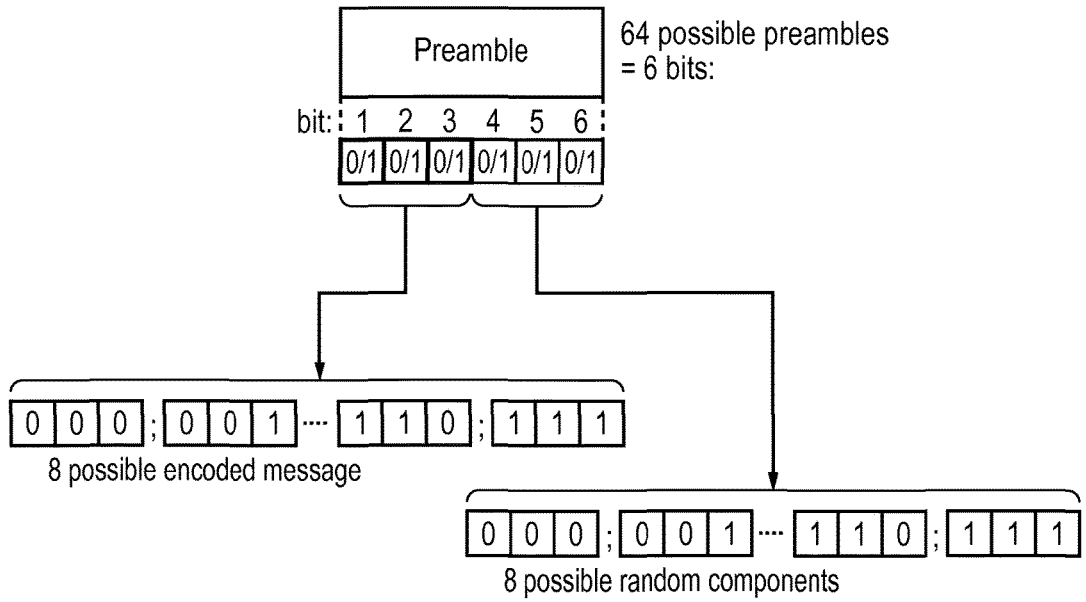
FIGS. 11 to 13 are examples of a preamble selection for encoding data to be transmitted in a random access channel.
Figure 12:
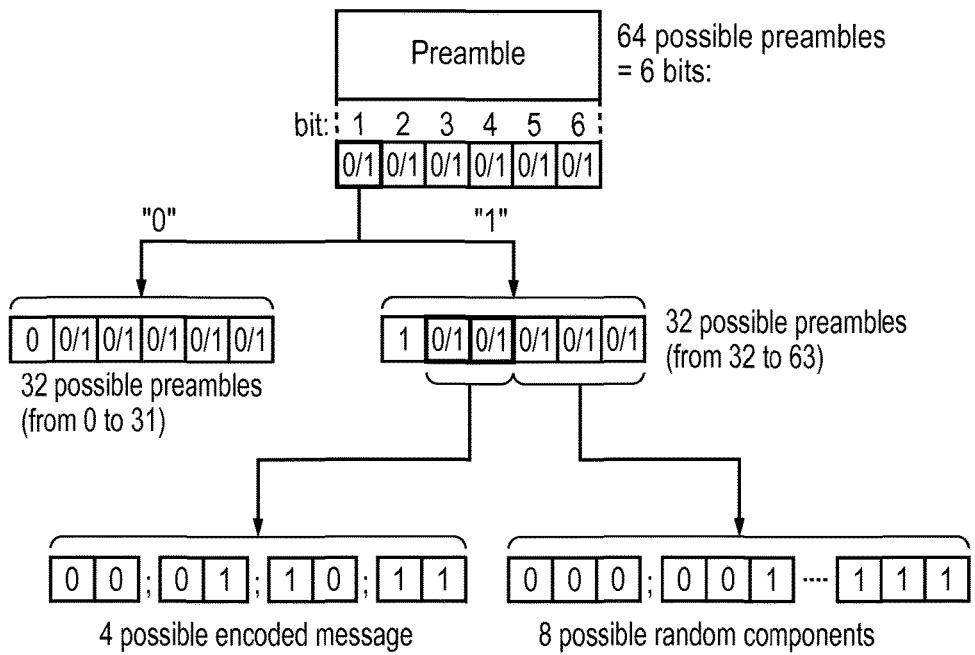
Figure 13:
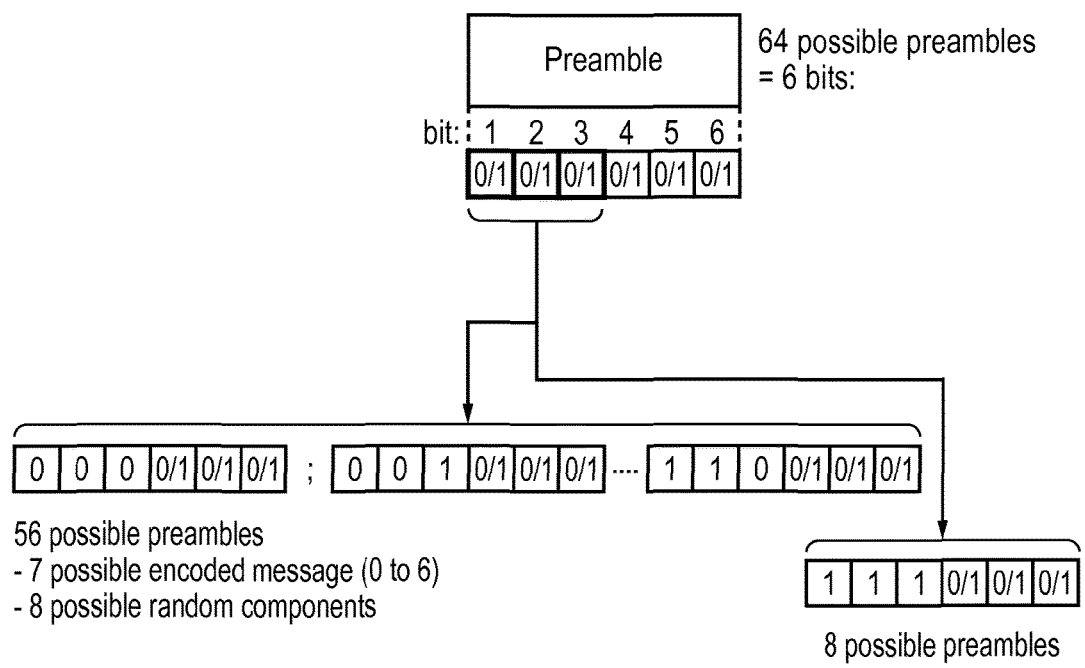

An additional encoding method may be used which uses a preamble selection in order to encode data for communication. There are 64 preambles available and the selection of a particular preamble may also be used to encode data in a RACH message. The conventional use of a preamble relies on a random selection of one preamble amongst the 64 possible preambles where the randomness is used to reduce the chances of collision between two terminals trying to send a RACH message at the same time. The preamble is also used for generating the RA-RNTI, that is, the terminal's ID for the RACH response. Because of this randomness aspect, the preamble as such does not carry any information in its conventional use. Examples of possible encoding methods using preamble selection are illustrated in FIG. 11-13, where the preambles have been represented as 6-bit numbers ranging from 0 to 63. In these Figures, the six bits have been numbered from 1 to 6 by decreasing weight.

In the example of FIG. 11, the preamble is selected so as to encode data in bits 1-3 and a random component in bits 4-6. Such an encoding method can provide three-bit encoded data in preambles thereby increasing the number of bits for encoding data sent via a RACH message. Also, in other examples, the number of preamble bits allocated to encoding data may differ from three and may vary from zero (no data encoding in preamble) to six (no random component). The skilled person will appreciate that this may for example be adjusted to suit a particular situation. If for example it is anticipated that several MTC devices may try to communicate data within the same period of time and that the data is likely to be similar, for example the first bits of the messages of all smart meters may have the same first bits, there may then be collisions between terminals that send the same preamble at about the same time. Such collisions are likely to cause uplink transmission failures and thus to reduce the uplink throughput. In such a case, it may be preferable to include a random component in the preamble so as to reduce the chances of collisions. The skilled person will therefore appreciate that there is a balance between sending more encoded data in one preamble, which increases a number of encoding bits and preventing collisions between preambles more, which increases a number of random bits.

In the example of FIG. 12, the bit with 1 is used to encode whether the preamble is used for a convention RACH uplink resources request (value: "0") or is used for encoding data (value: "1"). In other words, the preamble itself comprises an indication of whether it is to be interpreted as a conventional preamble or as an encoding preamble. In that example, if the first bit is set up to "0", the terminal may then randomly select one of the 32 possible preambles starting with "0" and use that preamble in a conventional manner. If the bit 1 is set up to "1", this indicates that the preamble is not used in a conventional manner but is used to encode data. The remainder of the preamble may be used to carry a combination of at least one encoding bit and the corresponding number of random bits. In FIG. 12, the illustrated preamble comprises two encoding bits (bits 2-3) and three random bits (bits 4-6). As discussed above, the balance between encoding bits and random bits may be adjusted depending for example on desired throughput and collision chances. This preamble configuration may be useful for example for a terminal that may be using preambles both for conventional RACH messages for example when requesting uplink resources and for sending encoded data as such a terminal can not only use both types of preambles but it can also dynamically indicate which one it is using on a per RACH message basis.

In the example of FIG. 13, the first three bits (bits 1-3) are used both to encode data and to indicate whether the preamble is used to encode data. These three bits can cover a total of eight combinations and amongst these combinations, one is reserved for preambles used in a conventional manner. These first three bits therefore work not only as encoding bits but also as an indicator of whether the preamble is to be interpreted as a conventional preamble or as an encoding preamble.

In an example ("example A"), a terminal may use a combination of the techniques used in FIGS. 9 and 12. Thus, in a frame, the terminal can send 5 preambles (one for a pair of sub-frames, each sub-frame comprising one block of RACH resources) and each preamble can encode one bit by its location within pairs of sub-frames, one bit using preamble positioning (the preamble's position in a block of RACH resources) and two bits using preamble selection. Therefore, the number of bits that the terminal can encode in one frame is "5×(1+1+2)=20 bits" per frame. In LTE, a frame has a total duration of 10 ms which provides a bitrate of 2 kbps for this specific combination of encoding methods.

In another example ("example B"), the blocks of RACH resources are only available in two sub-frames per frames, and a terminal may use a combination of sub-frame selection technique, preamble positioning and preamble selection techniques where the preamble is according to the example of FIG. 11 but with four encoding bits and two bits for the random component. In that case, a terminal can send one preamble per frame and each preamble can encode one bit with sub-frame selection, one bit with preamble positioning within the sub-frame and four bits with preamble selection, that is "1×(1+1+4)=6 bits" per frame. Thus the resulting throughput in LTE would be of 0.6 kbps.

In a further example ("example C"), a terminal may use a combination of the RACH resource block selection (and preamble positioning, both according to FIG. 9. The RACH resource block selection is equivalent to a sub-frame selection in the example of FIG. 9 because each sub-frame comprising a block of RACH resources comprises exactly one such block. In that situation, a terminal can send five preambles per frame and each preamble can encode one bit for its location within each pair of sub-frames and one bit with preamble positioning. Therefore, the number of bits that terminal can encode in one frame is "5×(1+1)=10 bits" per frame, i.e. gives a 1 kbps throughput.

However the overhead resulting in such an encoding may be rather low or high depending on the encoding method selected. This overhead will depend on the number of bits encoded per preamble as this will indicate the number of effective (i.e. encoding bits) relative to the total number of sent bits. As an illustration, in example A, for every six-bit preamble sent by the terminal, three bits are encoded, one with sub-frame selection, one with preamble positioning and one with preamble selection, which results in a 50% effectiveness and 50% overhead. In reality the overhead might be slightly lower as the terminal would first need to send a first RACH message (not encoding any data) for acquiring the timing advance. However, in the case of stationary terminals, this may be negligible as this may in fact be set up once and for all and may only require seldom updating. In example B, each preamble can be used to encode 6 bits such that the effectiveness is of 100% and the overhead is 0%. It is noteworthy that the effectiveness could be higher than 100%. If for example all six bits of the preamble are used to encode data and if the terminal also uses sub-frame selection and preamble positioning, each preamble can encode eight bits even thought the preamble itself consists of six bits. In this case, the effectiveness would be of 137% and the overhead of −37%. In example C, each preamble encodes two bits using a combination of two timing selection methods. Thus the effectiveness is of 37% and the overhead is of 63%.

A summary of the throughput and overhead for examples A-C is provided below:

|  | Example: | | |
|---|---|---|---|
|  | A | B | C |
| Throughput (kbps): | 2 | 0.6 | 1 |
| Overhead: | 50% | 0% | 63% |

The throughputs achieved with these methods are very low compared for example with the LTE maximum uplink throughput which is generally estimated as being in the range of 50 Mbps-80 Mbps. However, MTC devices usually have only small amount of data to transmit and are considered as being generally delay-tolerant, therefore such devices can possibly easily cope with a low throughput.

As the skilled person will recognise, the range of possible combinations of the encoding methods provides a vast number of possible outcomes in terms of throughput and efficiency. The skilled person may therefore select one that he believes is appropriate, for example taking into consideration the throughput, the overhead, the power consumption and any implementation constraint or cost on the terminal and/or eNB. Also, when taking these aspects into consideration, the skilled person may consider it preferable to use a conventional communication method in some situations. For example when large amounts of data are to be transmitted, the data/signalling ratio with a conventional method may be such that the skilled person may find it preferable to use a conventional method. For a shorter message where the amount of signalling involved in LTE is high compared to the actual amount of data to be transmitted, it may then be preferable to use a random access channel message to encode data.

Another advantage of the present invention is that the complexity of the terminal may be reduced by decreasing the number of components required by the terminal to communicate using the radio interface. For example, an MTC terminal may include a limited protocol implementation where the conventional protocol stacks are either implemented in a very basic manner, if implemented at all. Thus a reduction in complexity and costs may be achieved.

Reception and Decoding of Data Via a Random Access Channel

Once the message has been sent by the terminal 101, it arrives at the eNB 102 which can then decode the data transmitted via the random access message. Once the eNB 102 is aware of the encoding method used by the terminal, it can decode the received random access message simply by decoding the relevant bits in the preamble, if any, and by identifying the timing selected for sending the random access message, whether the timing selected relates to the block of random access resources selection, sub-frame selection and/or message positioning within the block of random access resources. The eNB may then for example forward the decoded data to an MTC application server 120 (e.g. within or without the mobile network), with for example any indication of the terminal's identity that the eNB 102 may have. Alternatively, the eNB may forward the message to another node, for example a S-GW 103, a P-GW 104 or a MME 105, where this other node will be in charge of the routing of the decoded data to its destination, for example the MTC application server 120. In another example, the eNB may retrieve the destination and/or instructions for the data processing in the decoded data itself.

For the eNB to know whether the terminal is sending a random access message as a conventional random access message or as a message used to encode data, and in the latter case, how the data was encoded, several options may be considered appropriate.

Various situations can be considered: the terminal may be "hard-coded" to use data encoding in every random access message; it may be using the random access channel sometimes in a conventional manner and sometimes for sending encoded data; or it may always be using the random access channel in a conventional manner. Also, for any terminal that may be using the random access channel for sending encoded data, the encoding method may either be "hard-coded" in advance or by dynamically selected. The eNB may have to know some or all of this information in order to identify encoded data and to decode it accurately.

The eNB may acquire some or all of the relevant information in different manners. For example, the terminal may be flagged as a MTC device using a random access channel only to send encoded data using a specific encoding method. The eNB may for example retrieve this "flagging" information from a HSS/HLR in the mobile network or may store this information itself. Alternatively, the terminal may send a message to the eNB in order to indicate its capabilities, either in an existing capability message provided by the mobile network or in another type of capability message. For example, the capabilities may differ depending on a time period, such as day(s) of the month, time of day, or any other suitable time period. In another example, the RACH message itself may include information as to the presence of any encoded data and/or the encoding method used.

Figure 14:
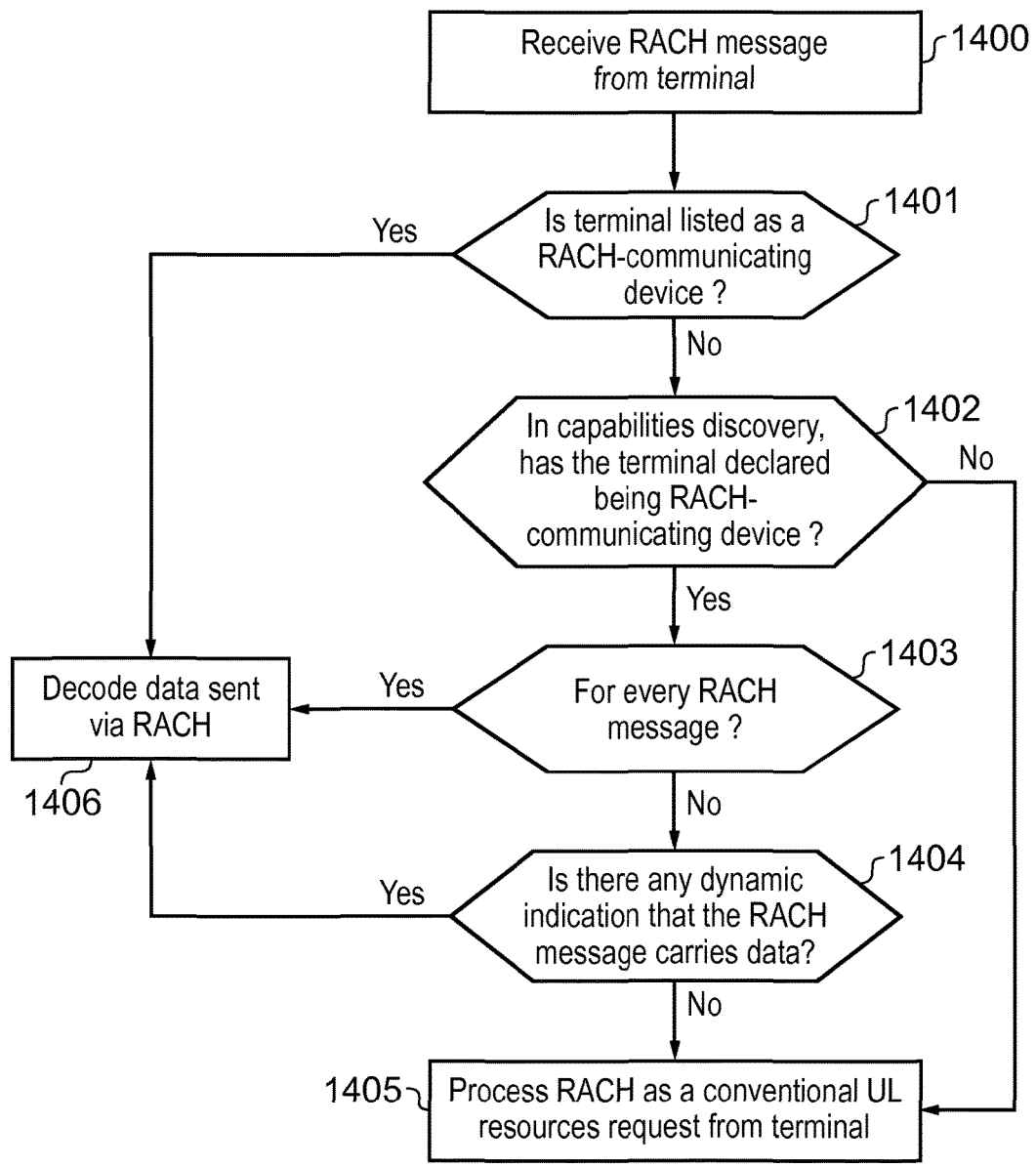
FIG. 14 is an example of a method for detecting that a terminal is sending data using an uplink random access channel.

An example of a method of processing of an incoming random access message is illustrated in FIG. 14. At first, an eNB 102 receives a RACH message from a terminal 101 at a step 1400. Upon reception of the message, it can be checked at 1401 whether the terminal is listed as a terminal using RACH message to send encoded data only. In case it is, the method then moves to a step 1406 where the RACH message is decoded. If it is not listed, it can then be checked at a step 1402 if during a capability discovery method the terminal has identified itself as a terminal using RACH to send encoded data. If the answer to the check at a step 1402 is yes, then it can be check at a step 1403 whether the terminal declared sending encoded data in every RACH message. If the answer is yes, then the RACH message can be decoded at a step 1406. If the answer to either of the checks of the steps 1402 and 1043 is no, the method can then move on to a step 1404. At this step, it is checked whether there is any indication that the RACH message comprise encoded data. Such an indication could be carried in the message itself (see for example "bit 1" in FIG. 12), or could have been provided in a previous message, for example in a first message to announce that the next ten random access messages from this terminal will contain encoded data. If such an indication is provided, then the method goes to a step 1406 where the RACH message is decoded. If no such indication can be found, the method then moves to a step 1405 where the RACH message is process as a conventional RACH message.

This method could also be modified, for example to remove one or more steps, for example step 1401 and/or to add additional steps such as for example a first checking step to determine whether the terminal is identified as always using RACH messages in a conventional manner so as to jump to the step 1405 then if possible.

A similar method may be implement for the eNB to determine which encoding method is used, if it is already pre-defined in the terminal 101 and in the eNB 102.

CONCLUSION

Generally, the invention has been described in an LTE environment as the invention can be advantageously implemented in this environment, however the invention is not limited to an LTE environment and may be implemented in any other suitable environment, in particular in any environment where a terminal may use at least timing selection to send data via a random access channel.

Various modifications can be made to examples of the present invention. Embodiments of the present invention have been defined largely in terms of reduced capability terminals, however, it will be understood that any suitable terminal can transmit and receive short messages according to the present disclosure, including conventional terminals such as a personal phone.

Also, for the ease of illustration and in the interest of intelligibility, only one node for each element of the network has been represented and discussed. However, the skilled person will understand that there may be more than one of each node. For example, the mobile network may comprise a plurality of eNB, of MME, of S-GW and/or of P-GW.

Various further aspects and features of the present invention are defined in the appended claims. Various modifications may be made to the embodiments described above without departing from the scope of the present invention. For example, embodiment of the present invention finds application with other types of mobile communications networks and is not limited to LTE.

The invention claimed is:

1. A mobile communications terminal, comprising:
a transceiver configured to transmit uplink random access channel (RACH) messages on a radio interface to a base station of a mobile communications network, the radio interface provided by the base station and the RACH messages identifying an uplink RACH of the radio interface; and
circuitry configured to encode machine type communication (MTC) data within the uplink RACH by both preamble positioning within RACH resources and selecting a transmission timing for RACH messages within sub-frames of the uplink RACH, the encoded MTC data represented by the preamble position and the selected transmission timing, wherein
the transceiver transmits the MTC data via the uplink RACH to the base station by transmitting the RACH messages according to the preamble position and the selected transmission timing.

2. The mobile communications terminal according to claim 1, wherein
the base station schedules uplink transmission in time-adjacent sub-frames, and
the circuitry selects the transmission timing according to a subset of sub-frames within the sub-frames available for transmitting the RACH messages to represent at least part of the MTC data.

3. The mobile communications terminal according to claim 1, wherein
the uplink RACH includes a set of blocks of random access resources for the mobile communication terminal to send the RACH messages via the uplink RACH, and
the circuitry selects the transmission timing according to a subset of the blocks of random access resources from the set of blocks of random access resources to represent at least part of the MTC data.

4. The mobile communications terminal according to claim 1, wherein
the uplink RACH includes a set of blocks of random access resources for the mobile communication terminal to send the RACH messages via the uplink RACH, and
the circuitry selects the transmission timing according to a subset of resources within one block of random access resources to represent at least part of the MTC data.

5. The mobile communications terminal according to claim 1, wherein
the RACH messages includes a number from a sub-set of numbers, the number being for use by the mobile communications terminal to recognize a response to the mobile communications terminal, from the base station, to the RACH messages, and
the circuitry is configured to, for at least the RACH messages, select the number within the sub-set of numbers to represent at least part of the MTC data.

6. The mobile communications terminal according to claim 1, wherein the transceiver is configured to transmit a capability message to the base station, the capability message including an indication of a capability of the mobile communications terminal for transmitting the MTC data via the uplink RACH.

7. The mobile communications terminal according to claim 6, wherein
the indication is at least one of:
a capability to use a sub-frame timing selection method;
a capability to use a block of random access resources timing selection;
a capability to use a timing selection within a block of random access resources timing; and
a capability to use random access number selection, and
the capability message optionally indicating that the capability is static or dynamic and optionally including that a time period for the capability.

8. The mobile communications terminal according to claim 1, wherein the RACH messages includes an indicator to indicate that the MTC data is communicated via the RACH messages.

9. The mobile communications terminal according to claim 1, wherein the transceiver transmits the RACH messages in random access resources associated with MTC data communication via the uplink RACH, the random access resources being optionally dedicated to the MTC data communication via the uplink RACH.

10. The mobile communications terminal according to claim 1, wherein
   the transceiver is configured to receive timing advance information from the base station, and
   the circuitry is configured to modify the transmission timing in accordance with the timing advance information.

11. The mobile communications terminal according to claim 1, wherein the mobile communications network comprises a third generation partnership project (3GPP) compliant system.

12. The mobile communications terminal according to claim 1, wherein
   the mobile communications network comprises a long-term evolution (LTE) compliant system, and
   the base station is an e-NodeB.

13. A method of communicating using a mobile communications device, the method comprising:
   transmitting, by a transceiver of the mobile communications device, uplink random access channel (RACH) messages on a radio interface to a base station of a mobile communications network, the radio interface provided by the base station and the RACH messages identifying an uplink RACH of the radio interface;
   encoding, by circuitry of the mobile communications device, machine type communication (MTC) data within the uplink RACH by both preamble positioning within RACH resources and selecting a transmission timing for RACH messages within sub-frames of the uplink RACH, the encoded MTC data represented by the preamble position and the selected transmission timing; and
   transmitting, by the transceiver, the MTC data via the uplink RACH to the base station by transmitting the RACH messages according to the preamble position and the selected transmission timing.

14. The method of communicating according to claim 13, wherein
   the base station schedules uplink transmission in time-adjacent sub-frames, and
   the selecting, by the circuitry, includes selecting the transmission timing according to a subset of sub-frames within the sub-frames available for transmitting the RACH messages to represent at least part of the MTC data.

15. The method of communicating according to claim 13, wherein
   the uplink RACH includes a set of blocks of random access resources for the mobile communication terminal to send the RACH messages via the uplink RACH, and
   the selecting, by the circuitry, of the transmission timing includes selecting a subset of the blocks of random access resources from the set of blocks of random access resources to represent at least part of the MTC data.

16. The method of communicating according to claim 13, wherein
   the uplink RACH includes a set of blocks of random access resources for the mobile communication terminal to send the RACH messages via the uplink RACH, and
   the selecting, by the circuitry, of the transmission timing includes selecting a time to transmit the RACH messages within one block of random access resources by selecting subset of resources within the one block of random access resources to represent at least part of the MTC data.

17. The method of communicating according to claim 13, wherein
   the RACH messages includes a number from a sub-set of numbers, the number being for use by the mobile communications terminal in to recognize a response to the mobile communications terminal, from the base station, to the RACH messages, and
   the method further comprises selecting, for at least the RACH messages, a number within the sub-set of numbers to represent at least part of the MTC data.

18. The method of communicating according to claim 13, further comprising:
   transmitting a capability message to the base station, the capability message including an indication of a capability of the mobile communications terminal for transmitting the MTC data via the uplink RACH.

19. The method of communicating according to claim 18, wherein
   the indication is at least one of:
      a capability to use a sub-frame timing selection method;
      a capability to use a block of random access resources timing selection;
      a capability to use a timing selection within a block of random access resources timing; and
      a capability to use random access number selection, and
   the capability message optionally indicating that the capability is static or dynamic and optionally including that a time period for the capability.

20. The method of communicating according to claim 13, further comprising:
   inserting an indicator into the RACH messages, the indicator indicating that the MTC data is communicated via the RACH messages.

21. The method of communicating according to claim 13, wherein the mobile communications network is a third generation partnership project (3GPP) compliant network.

22. The method of communicating according to claim 21, wherein
   the mobile communications network comprises a long-term evolution (LTE) compliant system, and
   the base station is an e-NodeB.

23. A base station, comprising:
   circuitry configured to provide a radio interface in a mobile communications network; and
   a transceiver configured to
      receive uplink random access channel (RACH) messages on the radio interface from a mobile communications terminal, the RACH messages identifying an uplink RACH of the radio interface; and
      decode machine type communication (MTC) data encoded within the uplink RACH, by the mobile communications terminal, according to both preamble positioning within RACH resources and selection of a transmission timing for RACH messages within sub-frames of the uplink RACH.

24. The base station according to claim 23, wherein
   the circuitry schedules uplink transmission in time-adjacent sub-frames, and
   the mobile communications terminal selects the transmission timing according to a subset of sub-frames within the sub-frames available for transmission of the RACH messages to represent at least part of the MTC data.

* * * * *